United States Patent
Kavadiki et al.

(10) Patent No.: US 11,288,584 B2
(45) Date of Patent: Mar. 29, 2022

(54) SYSTEMS AND METHODS FOR PREDICTING GENDER AND AGE OF USERS BASED ON SOCIAL MEDIA DATA

(71) Applicant: Tata Consultancy Services Limited, Mumbai (IN)

(72) Inventors: Rajesh Kavadiki, Bangalore (IN); Soumyajit Das, Bangalore (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 837 days.

(21) Appl. No.: 15/630,659

(22) Filed: Jun. 22, 2017

(65) Prior Publication Data

US 2017/0372206 A1 Dec. 28, 2017

(30) Foreign Application Priority Data

Jun. 23, 2016 (IN) .............................. 201621021577

(51) Int. Cl.
*G06N 5/04* (2006.01)
*G06N 20/00* (2019.01)
(Continued)

(52) U.S. Cl.
CPC .............. *G06N 5/04* (2013.01); *G06N 20/00* (2019.01); *G06Q 10/04* (2013.01); *G06Q 30/0201* (2013.01); *G06Q 50/01* (2013.01)

(58) Field of Classification Search
CPC .......... G06N 5/04; G06N 20/00; G06Q 10/04; G06Q 30/0201; G06Q 50/01
See application file for complete search history.

(56) References Cited

U.S. PATENT DOCUMENTS 8,700,543 B2 4/2014 Glickman
9,324,006 B2* 4/2016 Vanhoucke ............... G06T 7/00
(Continued)

FOREIGN PATENT DOCUMENTS

WO WO-2016046744 A1 * 3/2016 ............. G06N 20/10

OTHER PUBLICATIONS

Peersman, C. et al. "Predicting Age and Gender in Online Social Networks," *Proceedings of the 3rd International Workshop on Search and Mining User-Generated Contents*, Oct. 24-28, 2011, Glasgow, United Kingdom; 8 pages.

(Continued)

*Primary Examiner* — Abdullah Al Kawsar
*Assistant Examiner* — Ahsif A. Sheikh
(74) *Attorney, Agent, or Firm* — Finnegan, Henderson, Farabow, Garrett & Dunner LLP (57) ABSTRACT

Prediction systems and methods are provided. The system obtains a first social media data pertaining to a first set of users, filters the first social media data to obtain a filtered social media data, generates a word embedding matrix including co-occurrence words each represented as a vector having a context, aggregates vectors pertaining each social data to obtain a first set of vectors, and trains machine learning technique(s) (MLTs) using the first set of vectors and context of the first set of vectors. The system further obtains a second social media data pertaining to a second set of users, and performs filtering, word embedding matrix generation, and aggregation operations to obtain a second set of vectors, and further applies the trained MLTs on the second set of vectors and context associated with the second set of vectors to predict age and gender of the second set of users.

6 Claims, 3 Drawing Sheets

(51) Int. Cl.
  *G06Q 30/02*   (2012.01)
  *G06Q 50/00*   (2012.01)
  *G06Q 10/04*   (2012.01)

(56) References Cited

U.S. PATENT DOCUMENTS

| | | | | |
|---|---|---|---|---|
| 9,406,072 | B2* | 8/2016 | Whitman | G06Q 30/02 |
| 10,740,802 | B2* | 8/2020 | Joshi | G06Q 30/0271 |
| 2012/0023041 | A1* | 1/2012 | Kariv | H04L 41/142 |
| | | | | 706/12 |
| 2012/0209795 | A1* | 8/2012 | Glickman | G06Q 30/0201 |
| | | | | 706/12 |
| 2013/0307779 | A1* | 11/2013 | Towell | G06F 40/174 |
| | | | | 345/168 |
| 2016/0203221 | A1* | 7/2016 | Rao | G06Q 50/01 |
| | | | | 707/707 |
| 2017/0011289 | A1* | 1/2017 | Gao | G06F 40/268 |
| 2017/0357890 | A1* | 12/2017 | Kim | G06F 40/30 |
| 2020/0327404 | A1* | 10/2020 | Miotto | G16H 50/70 |

OTHER PUBLICATIONS

Marquardt, J. et al. "Age and Gender Identification in Social Media," *5th Conference and Labs of the Evaluation Forum (CLEF 2014): Information Access Evaluation Meats Multilinguality, Muitimodality, and Interaction*, Sep. 15-18, 2014. Sheffield, United Kingdom; 8 pages.

* cited by examiner

SYSTEMS AND METHODS FOR PREDICTING GENDER AND AGE OF USERS BASED ON SOCIAL MEDIA DATA

PRIORITY CLAIM

This U.S. patent application claims priority under 35 U.S.C. § 119 to: India Application No. 201621021577, filed on Jun. 23, 2017. The entire contents of the aforementioned application are incorporated herein by reference.

TECHNICAL FIELD

The disclosure herein generally relate to prediction systems, and, more particularly, to systems and methods for predicting gender and age of users based on social media data.

BACKGROUND

Finding demographic information such as Age and Gender of the followers of a particular entity has always been a problem in social media. The current state of the art techniques uses posts from social media and extract features either using Term frequency Inverse document frequency (TFIDF) or a Bag of Words that implement a model to segregate between Male and Female and to find the relevant age group that the follower belongs to. These models are built on assuming each of the words represented in a scalar notion and hence may be inaccurate. Further given the volumes of social media data, and the posts by users, existing techniques may not predict demographic information of users, and may be prone to errors.

SUMMARY

Embodiments of the present disclosure present technological improvements as solutions to one or more of the above-mentioned technical problems recognized by the inventors in conventional systems. For example, in one aspect, a processor implemented method is provided. The method comprising (i) obtaining, using one or more hardware processors, a first social media data from one or more sources, the first social media data pertains to a first set of users; (ii) filtering the first social media data by identifying one or more stop words, and one or more expressions to obtain a first filtered social media data; (iii) generating a first word embedding matrix comprising a first set of co-occurrence words from the first filtered social media data, each co-occurrence word of the first set of co-occurrence words is represented as a vector comprising context (or contexts); (iv) aggregating one or more vectors pertaining each social data submitted by each user to obtain a first set of vectors for the first set of users based on the first word embedding matrix and the first set of co-occurrence words; and (v) training one or more machine learning techniques using (a) the first set of vectors, and/or (b) context associated with each of the first set of vectors to obtain one or more trained machine learning techniques.

In an embodiment, the processor implemented method may further comprise obtaining a second social media data from one or more sources, wherein the second social media data pertains to a second set of users; repeating the steps of (ii) till (iv) to obtain a second set of vectors for the second set of users based on the second social media data; and applying the one or more trained machine learning techniques (MLTs) on the second set of vectors, and context(s) associated with each of the second set of vectors. In an embodiment, the second set of vectors are obtained (or generated) by filtering the second social media data by identifying one or more stop words, and one or more expressions to obtain a second filtered social media data, generating a second word embedding matrix comprising a second set of co-occurrence words from the second filtered social media data, each of co-occurrence word from the second set of co-occurrence words is represented as a vector comprising context, and aggregating one or more vectors pertaining each social data submitted by each user based on the second word embedding matrix and the second set of co-occurrence words.

In an embodiment, the processor implemented method may further comprise predicting an age and a gender of each user from the second set of users upon the one or more machine learning techniques applied on the second set of vectors and the context associated each of the second set of vectors, and wherein each of the predicted age and the predicted gender are associated with a probability score.

In an embodiment, the step of applying the one or more trained MLTs may include selecting at least a subset of the one or more trained machine learning techniques based on a training level of the MLTs. In an embodiment, the at least a subset of the one or more trained machine learning techniques is selected based on a weight assigned to the one or more machine learning techniques during training.

In another aspect, a system is provided. The system comprises a memory storing instructions; one or more communication interfaces, and one or more hardware processors communicatively coupled to the memory using the one or more communication interfaces, wherein the one or more hardware processors are configured by the instructions to: (i) obtain a first social media data from one or more sources, the first social media data pertains to a first set of users; (ii) filter the first social media data by identifying one or more stop words, and one or more expressions to obtain a first filtered social media data; (iii) generate a word embedding matrix comprising a first set of co-occurrence words from the first filtered social media data, each co-occurrence word from the first set of co-occurrence words is represented as a vector comprising context; (iv) aggregate one or more vectors pertaining each social data submitted by each user to obtain a first set of vectors for the first set of users based on the on the first word embedding matrix and the first set of co-occurrence words; and (v) train one or more machine learning techniques using (a) the first set of vectors and/or (b) context associated with each of the first set of vectors to obtain one or more trained machine learning techniques.

In an embodiment, the one or more hardware processors are further configured to obtain a second social media data from one or more sources, wherein the second social media data pertains to a second set of users, repeat the steps (ii) till (iv) to obtain a second set of vectors for the second set of users based on the second social media data, and apply the one or more machine learning techniques (MLTs) on the second set of vectors and context associated with each of the second set of vectors.

In an embodiment, the second set of vectors are obtained (or generated) by filtering the second social media data by identifying one or more stop words, and one or more expressions to obtain a second filtered social media data, generating a second word embedding matrix comprising a second set of co-occurrence words from the second filtered social media data, each co-occurrence word from the second set of co-occurrence words is represented as a vector comprising context, and aggregating one or more vectors pertaining each social data submitted by each user based on the second word embedding matrix and the second set of co-occurrence words.

In an embodiment, the one or more hardware processors are further configured to predict an age and a gender of each user from the second set of users upon the one or more machine learning techniques applied on the second set of vectors, and wherein each of the predicted age and the predicted gender are associated with a probability score. In an embodiment, the one or more hardware processors are configured to select at least a subset of the one or more machine learning techniques based on a training level of the MLTs. In an embodiment, the at least a subset of the one or more machine learning techniques is selected based on a weight assigned to the one or more machine learning techniques during training.

In yet another aspect, one or more non-transitory machine readable information storage mediums comprising one or more instructions is provided. The one or more instructions which when executed by one or more hardware processors causes (i) obtaining, using one or more hardware processors, a first social media data from one or more sources, the first social media data pertains to a first set of users; (ii) filtering the first social media data by identifying one or more stop words, and one or more expressions to obtain a first filtered social media data; (iii) generating a first word embedding matrix comprising two or more co-occurrence words from the first filtered social media data, each co-occurrence word of the first set of co-occurrence words is represented as a vector comprising context; (iv) aggregating one or more vectors pertaining each social data submitted by each user to obtain a first set of vectors for the first set of users based on the first word embedding matrix and the first set of co-occurrence words; and (v) training one or more machine learning techniques using (a) the first set of vectors, and/or (b) context associated with each of the first set of vectors to obtain one or more trained machine learning techniques.

In an embodiment, the one or more instructions which when executed by one or more hardware processors may further cause obtaining a second social media data from one or more sources, wherein the second social media data pertains to a second set of users; repeating the steps of (ii) till (iv) to obtain a second set of vectors for the second set of users based on the second social media data; and applying the one or more trained machine learning techniques (MLTs) on the second set of vectors, and context associated with each of the second set of vectors. In an embodiment, the second set of vectors are obtained (or generated) by filtering the second social media data by identifying one or more stop words, and one or more expressions to obtain a second filtered social media data, generating a second word embedding matrix comprising a second set of co-occurrence words from the second filtered social media data, each of co-occurrence word from the second set of co-occurrence words is represented as a vector comprising a context, and aggregating one or more vectors pertaining each social data submitted by each user based on the second word embedding matrix and the second set of co-occurrence words.

In an embodiment, the one or more instructions which when executed by one or more hardware processors may further cause predicting an age and a gender of each user from the second set of users upon the one or more machine learning techniques applied on the second set of vectors and the context associated each of the second set of vectors, and wherein each of the predicted age and the predicted gender are associated with a probability score.

In an embodiment, the step of applying the one or more trained MLTs may include selecting at least a subset of the one or more trained machine learning techniques based on a training level of the MLTs. In an embodiment, the at least a subset of the one or more trained machine learning techniques is selected based on one or more weight(s) assigned to the one or more machine learning techniques during training.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Most of the social media tools in the market are around monitoring an entity (e.g., brand) such as monitoring Sentiments around hashtags, topics people are talking about and incremental increase in the followers count. However the industry as a whole has ignored in knowing Demographics information of the followers such as Age, Gender, Home Location, and Interests, Languages spoken, and the like. Without knowing them, an entity (e.g., organization or company) find it difficult to have a strategy in targeting social audience or get to know why few of the campaigns/engagements worked and few of them did not as they are hitting it in the dark. Without knowing the information, the entity (company) could spam a lot of marketing messages for all of the users after a while social media users may often discard the message as they have been spamming the users for a long time. Rather, if the company knows the demographic information it could target the right users with the right message such that the response rate is higher than the traditional methods/systems. The embodiments of the present disclosure address critical components of demographic information which is predicting age and gender of a follower. The proposed system takes raw posts from the social media handle and emits the percentage of users who are Male versus Female and the percentage of users who fall into different age bins. The posts which are nothing but a combination of words, these words would be represented as a feature vector from a neural network model. The aggregated features would be used to train hybrid classifier(s) (e.g., machine learning technique(s)) which has/have multiple classifiers with weights adjusted to maximize the accuracy. The proposed system may be built on big data architecture so that the steps of feature building and deriving weights happen much faster than traditional systems/methods.

Referring now to the drawings, and more particularly to FIGS. 1 through 3B, where similar reference characters denote corresponding features consistently throughout the figures, there are shown preferred embodiments and these embodiments are described in the context of the following exemplary system and/or method.

Figure 1:
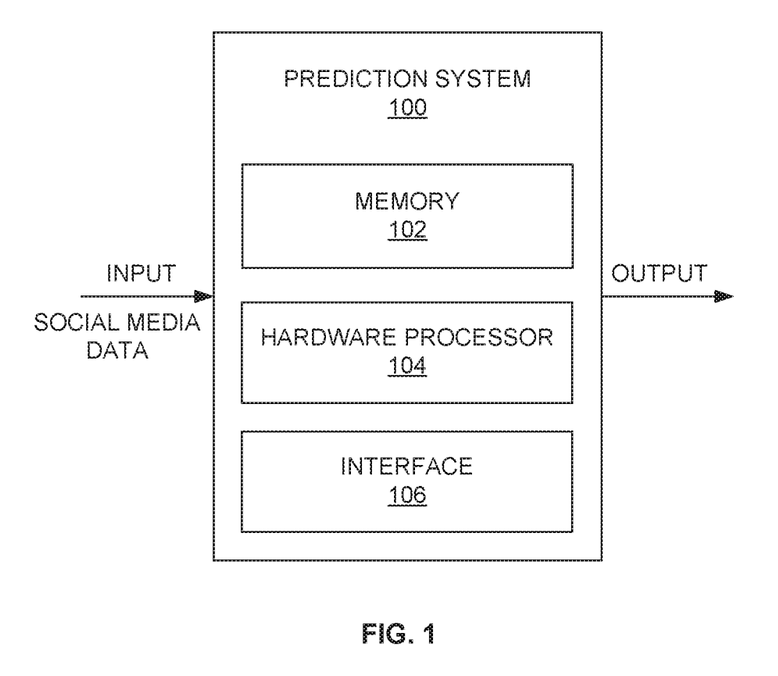
FIG. 1 is a block diagram illustrating a prediction system according to an embodiment of the present disclosure.

FIG. 1 is a block diagram illustrating a prediction system 100 according to an embodiment of the present disclosure. The terms "prediction system" and "system" may be interchangeably used herein after. The system 100 comprises a memory 102, a hardware processor 104, and an input/output (I/O) interface 106. Although the exemplary block diagram and the associated description refers to a memory, a hardware processor, and an input/output communication interface, it may be understood that one or more memory units, one or more hardware processors, and/or one or more communication interfaces may be comprised in the prediction system 100. The memory 102 may further includes one or more functional modules (not shown in FIG. 1). The memory 102, the hardware processor 104, the input/output (I/O) interface 106, and/or the modules may be coupled by a system bus or a similar mechanism. The prediction system 100 predicts age and/or gender of users for given input social media data (social media handles) received from (or obtained from) one or more sources. The one or more sources may comprise, for example but are not limited to, social websites, blogs, feeds, and the like. The input data (e.g., social media handles) is parsed and filtered by the system 100 based on information received from the one or more sources (not shown in FIG. 1) through one or more networks (not shown in FIG. 1).

The memory 102, may store instructions, any number of pieces of information, and data, used by a computer system, for example the system 100 to implement the functions of the system 100. The memory 102 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, instructions or the like for enabling the system 100 to carry out various functions in accordance with various example embodiments.

Additionally or alternatively, the memory 102 may be configured to store instructions which when executed by the hardware processor 104 causes the system 100 to behave in a manner as described in various embodiments. The memory 102 stores the functional modules and information, for example, information (e.g., time series data) received from the one or more sensors (not shown in FIG. 1) through the one or more networks (not shown in FIG. 1).

The hardware processor 104 may be implemented as one or more microprocessors, microcomputers, microcontrollers, digital signal processors, central processing units, state machines, logic circuitries, and/or any devices that manipulate signals based on operational instructions. Further, the hardware processor 104 may comprise a multi-core architecture. Among other capabilities, the hardware processor 104 is configured to fetch and execute computer-readable instructions or modules stored in the memory 102. The hardware processor 104 may include circuitry implementing, among others, audio and logic functions associated with the communication. For example, the hardware processor 104 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 104 thus may also include the functionality to encode messages and/or data or information. The hardware processor 104 may include, among others a clock, an arithmetic logic unit (ALU) and logic gates configured to support operation of the hardware processor 104. Further, the hardware processor 104 may include functionality to execute one or more software programs, which may be stored in the memory 102 or otherwise accessible to the hardware processor 104.

Figure 2:
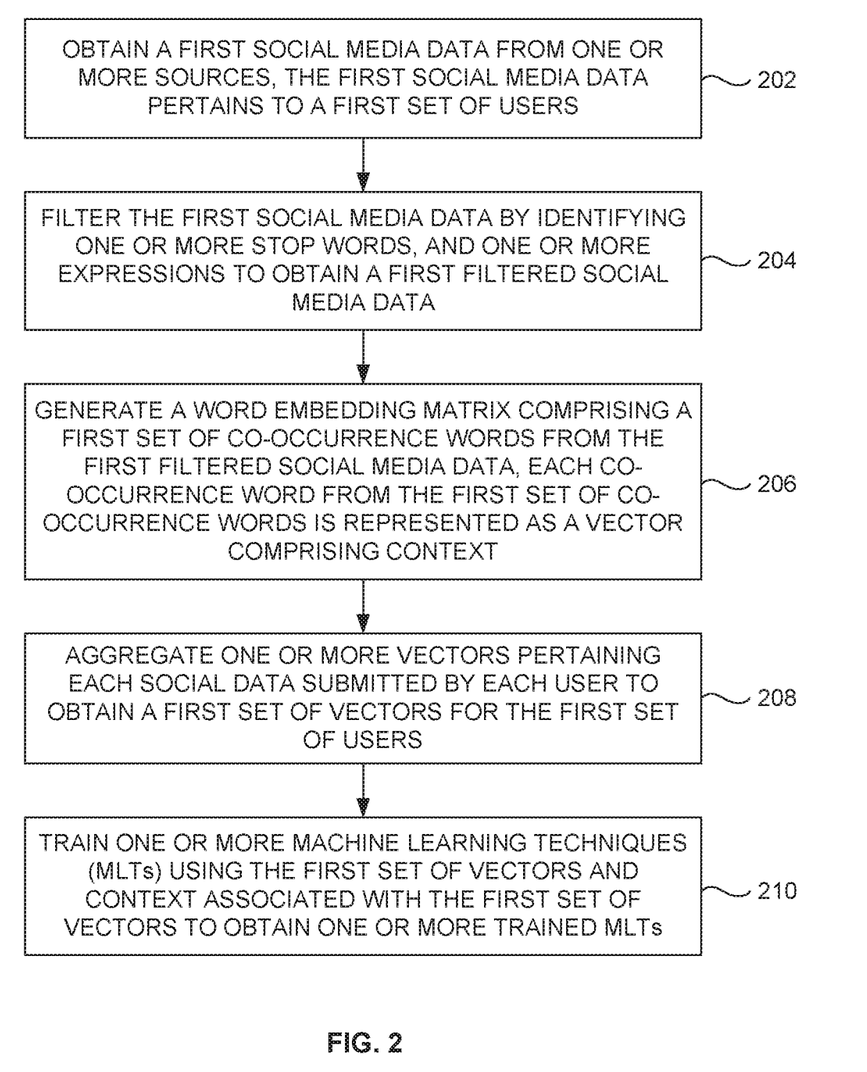
FIG. 2 is a flow diagram illustrating a processor implemented method for predicting age and/or gender of users using the prediction system of FIG. 1 according to an embodiment of the present disclosure.

FIG. 2, with reference to FIG. 1, is a flow diagram illustrating a processor implemented method for predicting age and/or gender of users using the prediction system 100 according to an embodiment of the present disclosure. The steps of the method of the present disclosure will now be explained with reference to the components of the system 100 as depicted in FIG. 1. The hardware processor 104 is configured by the instructions stored in the memory 102. The hardware processor 104 when configured by the instructions predicts age and/or gender of users as described hereinafter. In an embodiment, at step 202, the hardware processor 104 obtain a first social media data from one or more sources. The first social media data pertains to a first set of users. In an embodiment, the first social media data may comprise, but is not limited to, blog posts, feeds, tweets, comments obtained from one or more sources (e.g., social websites such as LinkedIn®, Twitter®, Facebook®, microblogging websites, and the like).

At step 204, the hardware processor 104 filters the first social media data by identifying one or more stop words, and one or more expressions to obtain a first filtered social media data. For example, expressions may refer to (i) emoticons that enable determining the context of media data and the topics and/or discussion being engaged by the one or more users, (ii) special characters or symbols for example, @, !, #, and the like. At step 206, the hardware processor 104 generates a first word embedding matrix comprising a first set of co-occurrence words (e.g., two or more co-occurrence words) from the first filtered social media data, each co-occurrence word from the first set of co-occurrence words is represented as a vector comprising a context. For example, vectors difference between Man and women are similar to vector differences between king and queen) and the vectors that are similar are almost occurring next to each other. The vector representation of a word is achieved by building a neural network model (e.g., Words continuous bags of words (CBOW) and Skip-Gram). If the neural network is provided enough training data it produces word vectors with specific characteristics, in which words with similar meanings appear in clusters, and clusters are spaced such that some word relationships, such as analogies, can be reproduced using vector math.

After data Pre Processing, only English words are retained for every post or blog (if posts are made in English language). Now these words are mapped to vectors using Word Embedding. In an embodiment, the embodiments of the present disclosure implements two ways to generate vector from Words continuous bags of words (CBOW) and Skip-Gram. CBOW predicts current words based on context. CBOW has one hidden layer, and the input to this is context and output is word relevant to the given context. Skip-Gram predicts context based on given word. This model generates similar context from a given word. Skip Gram uses neural network model to find similar words. It takes one word and predicts similar words. In other words, it is a map from word to context. The system 100 is implemented in such a way that it also works better with small training data. This provides a window size that could be used to determine how (far) forward and backward to look for the context. The target word is the input in this model and the context words are the output in this model. CBOW and Skip-Gram both is basically neural network with one hidden layer. CBOW uses one or more unsupervised models to obtain (or generate) center word from surrounding words. Whereas Skip Gram uses neural network to generate (or obtain) surrounding context from a center word. Based on the above two ways, words are mapped to vectors. Skip gram is a neural network model with input and output layer and one hidden layer.

In CBOW model, the system 100 uses an unsupervised neural network with text input and the output is context of words. Here the weights in hidden layer are the vector representation of the word. A window of words of size N is passed. In other words, continuous N numbers of words is passed as input in the CBOW model to generate weight as output. This enables the CBOW model in the system 100 to predict center word as a sum of surrounding word(s).

At step 208, the hardware processor 204 aggregates one or more vectors pertaining each social data submitted by each user to obtain a first set of vectors for the first set of users based on the first word embedding matrix and the first set of co-occurrence words. At step 210, the hardware processor 204 trains one or more machine learning techniques (MLTs) using (a) the first set of vectors and/or (b) context associated with the first set of vectors to obtain one or more trained machine learning techniques. During the training of the MLTs, the system 100 may involve user intervention for identifying age and gender of the first set of users, which is learnt by the system 100 for subsequent predictions.

The method may further comprise obtaining a second social media data from one or more sources, wherein the second social media data pertains to a second set of users. In one example embodiment, the first set of users may be different from the second set of users. In another example embodiment, the first set of users and the second set of users may be identical. In yet another example embodiment, the second set of users may comprise at least a subset of one or more users from the first set of users.

The method may further comprise repeating the steps of 204 till 208 to obtain a second set of vectors for the second set of users based on the second social media data. In an embodiment, the second set of vectors are obtained (or generated) by filtering the second social media data by identifying one or more stop words, and one or more expressions to obtain a second filtered social media data, generating a second word embedding matrix comprising a second set of co-occurrence words from the second filtered social media data, each of co-occurrence word from the second set of co-occurrence words is represented as a vector comprising a context, and aggregating one or more vectors pertaining each social data submitted by each user based on the second word embedding matrix and the second set of co-occurrence words.

The method may further comprise applying the one or more trained machine learning techniques (herein referred as MLTs or trained MLTs) on a second set of vectors and context associated with each of the second set of vectors to predict age and gender of the second set of users. In an embodiment, the step of applying the one or more trained MLTs includes selecting at least a subset of the one or more machine learning techniques based on a training level of the MLTs. In another embodiment, the subset of the trained one or more machine learning techniques is selected based on one or more weight(s) assigned to the one or more machine learning techniques during training. For example, a first machine learning technique may be assigned less weight compared to a second machine learning technique during training and accordingly used for prediction. Similarly, the first machine learning technique may be assigned higher weight compared to the second machine learning technique during training and accordingly used for prediction.

Figure 3A:
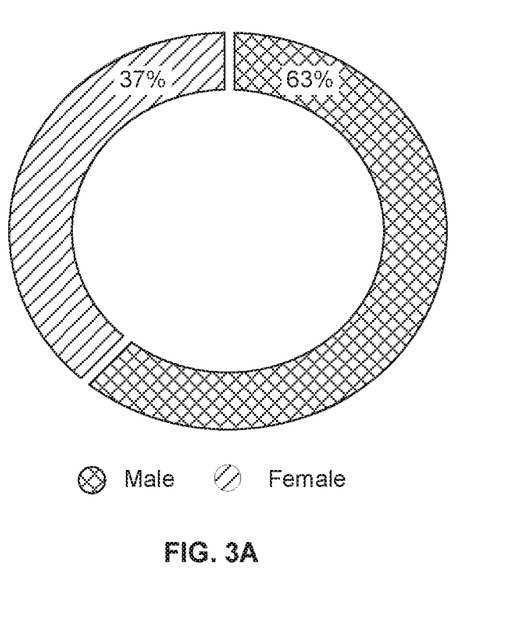
FIG. 3A is a graphical representation illustrating gender prediction using the prediction system of FIG. 1 according to an embodiment of the present disclosure.
Figure 3B:
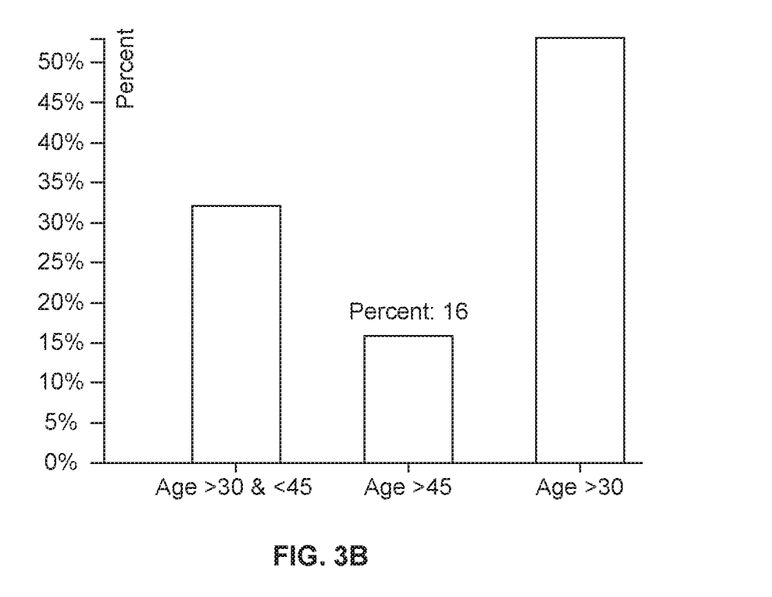
FIG. 3B is a graphical representation illustrating age prediction using the prediction system of FIG. 1 according to an embodiment of the present disclosure.

FIG. 3A, with reference to FIGS. 1-2, is a graphical representation illustrating gender prediction using the prediction system 100 of FIG. 1 according to an embodiment of the present disclosure. FIG. 3B, with reference to FIGS. 1 through 3A, is a graphical representation illustrating age prediction using the prediction system 100 of FIG. 1 according to an embodiment of the present disclosure. As depicted in FIG. 3A, the system 100 has predicted 63% as Male users, and remaining 37% as Female users. Similarly, as depicted in FIG. 3B, the system 100 has predicted 32% of users are of the age greater than 30 and less than 45, 16% of users are of the age greater than 45, and 52% of users are of the age greater than 30.

Below is an illustrative example of users associated with social media handles for that are used for training the MLTs and predicting age and gender of users for subsequent social media handles received from the one or more sources by the system 100:

| Source - Twitter ® Handle | Gender | Age |
| --- | --- | --- |
| John Doe | M | 50 |
| Marc Anthony | M | 30 |
| Jessy Mathew | F | 30 |
| Paul Andrews | M | 40 |
| Josie Mazz | F | 20 |
| Julia Rodrigues | F | 35 |
| Anthony Headley | M | 30 |
| Sh_Root | F | 30 |

Social media handles (e.g., posts from users) may be collected as text files. Below is an illustrative example of text files pertaining to social media handles obtained from one or more sources pertaining to one or more users:

| Files | Size | Modified |
| --- | --- | --- |
| Aaanda.txt | 169 bytes | 12/08/2015 |
| AAB.txt | 366.4 kB | 03/21/2016 |
| Aadamsjk.txt | 3.5 kB | 12/08/2015 |
| aaronxyz.txt | 69.6 kB | 12/08/2015 |
| Abcsyx.txt | 862 bytes | 12/08/2015 |
| Doc662.txt | 175.2 kB | 12/08/2015 |
| Next.txt | 95 bytes | 12/08/2015 |
| Axbycz.txt | 19.7 kB | 12/08/2015 |

Below are exemplary tweets from users obtained in text files:
Doc1.txt
Doc2.txt
Doc3.txt At first step, raw Twitter® post are collected (e.g., English language posts) and the data is cleaned by filtering regular expression, stop words. In an embodiment, numerical part (if any) is also removed in this step. This preprocessing is required to avoid unnecessary words and alpha numeric strings. Cleaned (or cleansed) data is parsed into set of words and stop words are removed from the text. Finally the output is a word token, which contains only English words. This output is referred to as filtered social media data. The output may be obtained in text files and illustrated as below:
Doc1_clean.txt
Doc2_clean.txt English words for every post or blog are obtained, and these words are mapped to vectors using one or more word embedding techniques and one or more word embedding matrices are generated. In an embodiment, each of the word embedding matrices that is generated comprises two or more co-occurrence words from the filtered social media data (e.g., also referred herein as a first filtered social media data), wherein each of the two or more co-occurrence words is represented as a vector comprising a context. For each of the word along the tweets that are for a particular observation, the system 100 would get the vectors of a word from the process described above. For example, if a sentence from a tweet comprises "Good ideas are everywhere", then the system 100 generates a vector for each word that represents (or is indicative) of a context. In this case, the system 100 generates vectors for Good, ideas, and everywhere.

Vector generated for "Good" word is provided by way of example below:
[1.25585452e-01, 8.95408466e-02, 1.72358733e-02,
8.14622268e-03, 2.46160245e-03, −2.84055561e-01,
1.96206033e-01, 4.99329355e-04, −5.58191016e-02,
3.87661606e-02, −1.38308540e-01, 5.95305711 e-02,
6.14725910e-02, 1.11185340e-02, −7.46768725e-04,
−1.45599216e-01, 1.21778548e-01, −1.47258997e-01,
9.37991515e-02, −3.46277803e-02, 4.62088063e-02,
1.03828587e-01, −9.84335467e-02, 1.80213511 e-01,
1.08742267e-01, 3.14964168e-02, −9.35622212e-03,
−9.11046192e-02, 9.83294472e-02, 8.52407813e-02,
−3.22643295e-02, 1.24395750e-02, −7.62641579e-02,
. . .
. . .
−7.47049693e-03, −4.76722755e-02, 8.50704238e-02,
7.40774497e-02]

Similarly, vector generated for "ideas" word is provided by way of example below:
[−3.20962071 e-01, 1.89913943e-01, −1.84740126e-01,
4.13774289e-02, −2.08987538e-02, −2.14187756e-01,
−7.60954916e-02, −7.65166730e-02, 7.25260824e-02,
7.38985464e-02, 3.54840234e-02, 1.50459511 e-02,
1.35536686e-01, −6.42240644e-02, 1.85918249e-02,
4.05372567e-02, 1.68867081 e-01, 9.71348658e-02,
−1.87286794e-01, −1.26740979e-02, −1.82700884e-02,
−6.99698105e-02, −1.77372873e-01, 1.85531542e-01,
2.53246203e-02, −7.18138590e-02, 5.57644218e-02,
−1.30319223e-01, −4.63396683e-02, −1.11032784e-01,
4.96739335e-02, −1.10228881 e-02, −1.99442729e-01,
. . .
. . .
−5.62054701 e-02, 2.99595535e-01, 5.93595318e-02,
−8.40706304e-02]

Similarly, vector generated for "everywhere" word is provided by way of example below:
[−5.15096150e-02, 7.85346925e-02, 1.43837720e-01,
−8.87266770e-02, −1.73664838e-02, 1.36308018e-02,
2.47022510e-02, 7.00908061 e-03, 3.34266312e-02,
6.14521392e-02, −2.32754070e-02, 3.68439145e-02,
−2.63769682e-02, −1.73685521 e-01, 3.19406465e-02,
1.67125240e-02, −3.70162092e-02, −7.49795809e-02,
4.18233871 e-02, −4.56297919e-02, −1.49014741 e-01,
−3.06594055e-02, −1.60613284e-02, −6.14891835e-02,
−7.75944144e-02, 7.69731924e-02, −7.82326832e-02,
−4.42386083e-02, −2.68745571 e-02, −1.50778279e-01,
7.77657926e-02, −2.91989942e-04, −6.59529641 e-02,
−6.71808124e-02, −6.51214570e-02, −1.06198646e-01,
. . .
. . .
−2.73044687e-02, 2.14668084e-02, −1.93677545e-02,
6.45804629e-02]

These words are mapped to vectors. For each document (Post/Sentence) there may be multiple words. Hence, the vectors for all words are obtained and aggregated in such a way that it becomes same size for every documents. In an embodiment, an average is obtained to aggregate vectors. These vectors are used as the input feature for modelling in next step. In other words, these vectors would be aggregated and an average of the vectors would be a feature for a particular observation. In an embodiment, average of words is vector to get sentence level vector: Good ideas are everywhere. Below is an illustrative example of aggregation of vectors:
[−2.46886238e-01, 3.57989490e-01, −2.36665308e-02, −3.92030254e-02
−3.58036347e-02, −4.84612525e-01, 1.44812793e-01, −6.90082610e-02
5.01336120e-02, 1.74116850e-01, −1.26099929e-01, 1.11420438e-01
1.70632318e-01. −2.26791054e-01, 4.97857034e-02, −8.83494392e-02
2.53629416e-01. −1.25103712e-01, −5.16642556e-02, −9.29316729e-02
−1.21076025e-01, 3.19937058e-03, −2.91867763e-01, 3.04255873e-01
5.64724654e-02, 3.66557501 e-02, −3.18244845e-02, −2.65662432e-01
2.51152217e-02, −1.76570281 e-01, 9.51754004e-02, 1.12469704e-03
−3.41659844e-01, −5.67055196e-02, 3.12313265e-01, −2.74684340e-01
2.06839591 e-02, 9.66075361 e-02, −1.39024436e-01, −1.19441092e-01
. . .
. . .
−9.09804404e-02, 2.73390085e-01, 1.25062197e-01, 5.45872822e-02]

By doing so, the system 100 generates vector for every Twitter® handle from their tweet as illustrated by way of examples below:

Doc1_Vector.txt
Doc2_Vector.txt

The vectors are provided as inputs to the one or more training machine learning techniques to predict age and/or genders of users pertaining to one or more tweets made by them. The one or more trained machine learning techniques may comprise, but are not limited to, using logistic regression (LR) technique, Support Vector Machine (SVM) technique, Gradient Boosting technique (GB), Extreme Gradient Boosting (EGB) technique, and the like. Once the output probabilities as vectors are obtained, the one or more trained machine learning techniques are applied to obtain a final output. In an embodiment, at the end, all the output vectors from different models is taken in a new data set and actual goal that is gender classification are used as a target variable. A model can now be built on this data or some voting or averaging method(s)/technique(s) (e.g., majority voting technique(s), stacking technique(s), boosting technique(s)) may be implemented to get the final output. In an embodiment, the system 100 builds model on top of previous output in order to obtain an error correction.

Final Model with Optimal Weight for all models are illustrated by way of example below:

Final Score for Gender=0.2*Logistic Regression (LR)+ 0.5*SVM+0.3*GB

Final Score for Age=0.3*Logistic Regression (LR)+ 0.46*SVM+0.24*GB.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure provide systems and methods for predicting age and gender of users (individuals) based on social media handles obtained from one or more sources. The system 100 implements neural network(s) based technique(s) to learn global and local context of the words. This technique(s) learns word contexts and represents them in a vector space in comparison with a TFIDF technique that represents a word as a number (Scalar). Using one representation simply cannot capture different meanings of a word that can differ depending on a context (for example, Bank can mean a River Bank or a Financial Bank), for which the system 100 would know depending on the context. By knowing the context of the words helps the system 100 to better understand the features and the prediction accuracy will be higher than the traditional systems.

The system 100 enables achieve faster solution big data platform with multi-client server based architecture being deployed with the various user allowable configurations. This proposed architecture allows data to process in multiple systems. The system 100 enables one or more users to configure various parameters to manage data size and run time complexity, by employing one or more parallel processing techniques (e.g., map reduce framework).

The system 100 is able to provide more accurate prediction by implementing the trained MLTs, where the weights are assigned to these trained MLTs at the time of training, and predicting age and gender for subsequent social media handles. The training of MLTs has enabled the system 100 to select and weight these MLTs for prediction which may be further dependent on how closely each MLT represents (or has represented) observed conditions in the present and in the recent past.

As traditional systems do not consider the context into consideration, they are limited with the words that are there in the posts and cannot extrapolate information from the limited words. This drawback affects the overall system in classifying the social media handles into age group and gender as it is observed that most of the social media handles that follow an entity (e.g., a brand) have limited posts. The proposed system 100 learns the context of the words and can extrapolate the information from a smaller set of posts to achieve a better accuracy when compared to traditional systems.

Additionally, the system 100 is configured to build context sensitive features where in the features of a word is represented in an N dimensional vector space and the vectors represent the context of the word. The system 100 exploits the application of hybrid modelling to overcome the limitation of individual models and to achieve a higher accuracy. As described above, the system 100 is built on distributed architecture where the technique(s) (or method(s)) have been sent to different CPU and each CPU handles a certain load of data and finally aggregates each of the results from different CPU's and provides the consolidated result. The system 100 has the ability to integrate with any of the platforms and enable users to run age and gender prediction by invoking the system 100 with input posts (e.g., Twitter®, Blogs, Facebook® posts, WhatsApp® messages, Review articles, and the like).

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method, comprising:
   (i) obtaining, using one or more hardware processors, a first social media data from one or more sources, said first social media data pertains to a first set of users, wherein the first social media data are raw posts from social media handles of the first set of users, the raw posts being obtained as text files;
   (ii) filtering said first social media data by identifying and removing one or more stop words, alpha numeric strings, and one or more expressions to obtain a first filtered social media data, wherein the one or more expressions are emoticons and special characters, and wherein the first filtered social media data is obtained containing English words;
   (iii) generating a word embedding matrix comprising a first set of co-occurrence words from said first filtered social media data, each co-occurrence word from said first set of co-occurrence words is represented as a vector comprising context, wherein the vector representation of each co-occurrence word is achieved by building a neural network model from a continuous bags of words (CBOW) and a Skip-Gram, and wherein the CBOW predicts words relevant to a given context, and the Skip-Gram predicts similar contexts from a given word, wherein the neural network model generates vectors wherein words with similar meanings and context appear in clusters, and the clusters are spaced such that relationship of the words with similar meaning can be reproduced using the vectors;
   (iv) aggregating the vectors of all co-occurring words pertaining to each social media data submitted by each user to obtain a first set of vectors for said first set of users;
   (v) training machine learning techniques using said first set of vectors and context associated with said first set of vectors to obtain the trained machine learning techniques, wherein the trained machine learning techniques comprises a Logistic regression (LR) technique, a Support Vector Machine (SVM) technique, and a Gradient Boosting technique (GB);
   (vi) obtaining a second social media data from the one or more sources, wherein said second social media data pertains to a second set of users;
   (vii) repeating the steps of (ii) till (iv) to obtain a second set of vectors for said second set of users based on said second social media data;
   (viii) applying said trained machine learning techniques (MLTs) on said second set of vectors and context associated with each of said second set of vectors; and
   (ix) predicting an age and a gender of each said second set of users by:
      computing a probability score to predict age by assigning a weight to SVM higher than a weight assigned to the LR and a weight assigned to the GB, and wherein the weight assigned to the GB is lower than the weight assigned to the LR; and
      computing a probability score to predict gender by assigning a weight to SVM higher than a weight assigned to the LR and a weight assigned to the GB, and wherein the weight assigned to the LR is lower than the weight assigned to the GB.

2. The processor implemented method of claim 1, wherein applying said one or more trained machine learning techniques includes selecting at least a subset of said one or more trained machine learning techniques based on a training level of the machine learning techniques.

3. A system comprising:
   a memory storing instructions;
   one or more communication interfaces; and
   one or more hardware processors communicatively coupled to said memory using said one or more communication interfaces, wherein said one or more hardware processors are configured by said instructions to:
      (i) obtain a first social media data from one or more sources, said social media data pertains to a first set of users, wherein the first social media data are raw posts from social media handles of the first set of users, the raw posts being obtained as text files;
      (ii) filter said first social media data by identifying and removing one or more stop words, alpha numeric strings, and one or more expressions to obtain a first filtered social media data, wherein the one or more expressions are emoticons and special characters, and wherein the first filtered social media data is obtained containing English words;
      (iii) generate a word embedding matrix comprising a first set of co-occurrence words from said first filtered social media data, each co-occurrence word from said first set of co-occurrence words is represented as a vector comprising context, wherein the vector representation of each co-occurrence word is achieved by building a neural network model from a continuous bags of words (CBOW) and a Skip-Gram, and wherein the CBOW predicts words relevant to a given context, and the Skip-Gram predicts similar contexts from a given word, wherein the neural network model generates vectors wherein words with similar meanings and context appear in clusters, and the clusters are spaced such that relationship of the words with similar meaning can be reproduced using the vectors;
(iv) aggregate the vectors of all co-occurring words pertaining each social media data submitted by each user to obtain a first set of vectors for said first set of users; and
(v) train machine learning techniques using said first set of vectors and context associated with said first set of vectors to obtain the trained machine learning techniques, wherein the trained machine learning techniques comprises Logistic regression (LR) technique, Support Vector Machine (SVM) technique, and Gradient Boosting technique (GB);
(vi) obtain a second social media data from the one or more sources, wherein said second social media data pertains to a second set of users;
(vii) repeat the steps of (ii) till (iv) to obtain a second set of vectors for said second set of users based on said second social media data;
(viii) apply said trained machine learning techniques (MLTs) on said second set of vectors and context associated with each of said second set of vectors; and
(ix) predict an age and a gender of each said second set of users by:
computing a probability score to predict age by assigning a weight to SVM higher than a weight assigned to the LR and a weight assigned to the GB, and wherein the weight assigned to the GB is lower than the weight assigned to the LR; and
computing a probability score to predict gender by assigning a weight to SVM higher than a weight assigned to the LR and a weight assigned to the GB, and wherein the weight assigned to the LR is lower than the weight assigned to the GB.

4. The system of claim 3, wherein said one or more hardware processors are configured to select at least a subset of said one or more machine learning techniques based on a training level of the machine learning techniques.

5. One or more non-transitory machine readable information storage mediums comprising one or more instructions which when executed by one or more hardware processors causes:
(i) obtaining, using the one or more hardware processors, a first social media data from one or more sources, said first social media data pertains to a first set of users, wherein the first social media data are raw post from social media handles of the first set of users, obtained as text files;
(ii) filtering said first social media data by identifying and removing one or more stop words, alpha numeric strings, and one or more expressions to obtain a first filtered social media data, wherein the one or more expressions are emoticons and special characters, and wherein the first filtered social media data is obtained containing English words;
(iii) generating a word embedding matrix comprising a first set of co-occurrence words from said first filtered social media data, each co-occurrence word from said first set of co-occurrence words is represented as a vector comprising context, wherein the vector representation of each co-occurrence word is achieved by building a neural network model from a continuous bags of words (CBOW) and a Skip-Gram, and wherein the CBOW predicts words relevant to a given context, and the Skip-Gram predicts similar contexts from a given word, wherein the neural network model generates vectors wherein words with similar meanings and context appear in clusters, and the clusters are spaced such that relationship of the words with similar meaning can be reproduced using the vectors;
(iv) aggregating the vectors of all co-occurring words pertaining to each social media data submitted by each user to obtain a first set of vectors for said first set of users;
(v) training machine learning techniques using said first set of vectors and context associated with said first set of vectors to obtain the trained machine learning techniques, wherein the trained machine learning techniques comprises Logistic regression (LR) technique, Support Vector Machine (SVM) technique, and Gradient Boosting technique (GB);
(vi) obtaining a second social media data from the one or more sources, wherein said second social media data pertains to a second set of users;
(vii) repeating the steps of (ii) till (iv) to obtain a second set of vectors for said second set of users based on said second social media data;
(viii) applying said trained machine learning techniques (MLTs) on said second set of vectors and context associated with each of said second set of vectors; and
(ix) predicting an age and a gender of each said second set of users by:
computing a probability score to predict age by assigning a weight to SVM higher than a weight assigned to the LR and a weight assigned to the GB, and wherein the weight assigned to the GB is lower than the weight assigned to the LR; and
computing a probability score to predict gender by assigning a weight to SVM higher than a weight assigned to the LR and a weight assigned to the GB, and wherein the weight assigned to the LR is lower than the weight assigned to the GB.

6. The one or more non-transitory machine readable information storage mediums of claim 5, wherein applying said one or more trained machine learning techniques includes selecting at least a subset of said one or more trained machine learning techniques based on a training level of the machine learning techniques.

\* \* \* \* \*